United States Patent

[11] 3,587,259

| [72] | Inventor | Bela Sandor<br>Detroit, Mich. |
|------|----------|-------------------------------|
| [21] | Appl. No. | 877,289 |
| [22] | Filed | Nov. 17, 1969 |
| [45] | Patented | June 28, 1971 |
| [73] | Assignee | General Motors Corporation,<br>Detroit, Mich. |

[54] LATCH OPERATING ARRANGEMENT
4 Claims, 7 Drawing Figs.

[52] U.S. Cl. ................................. 70/218, 70/208
[51] Int. Cl. ............................... E05b 13/00, E05b 5/00
[50] Field of Search .......................... 70/208, 218

[56] References Cited
UNITED STATES PATENTS
269,953  1/1883  Moritz .......................... 70/218

1,359,921  11/1920  Vanderlip ..................... 70/218X
2,333,861  11/1943  Harden ........................ 70/218

*Primary Examiner*—James A. Leppink
*Assistant Examiner*—Albert G. Craig, Jr.
*Attorneys*—W. E. Finken and D. L. Ellis

ABSTRACT: A latch operating arrangement for vehicle bodies includes a handle unit wherein an operating lever and a handle are rotatably mounted on a common axis of an escutcheon fixed to the door. The operating lever is operatively connected to the latch mechanism and the handle is freewheelable relative to the operating lever until coupled thereto by lock means mounted on the escutcheon whereupon rotation of the handle operates the door latch mechanism through the operating lever.

INVENTOR
Bela Sandor
BY
D. L. Ellis
ATTORNEY

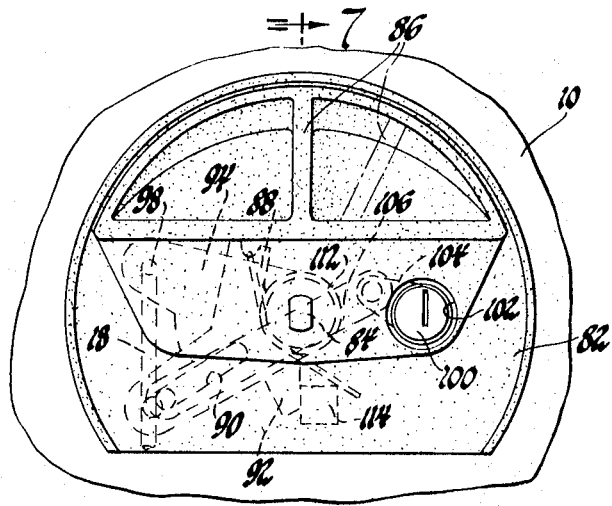
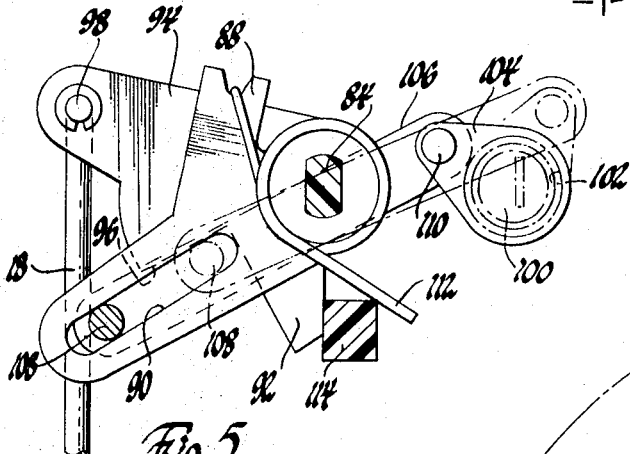
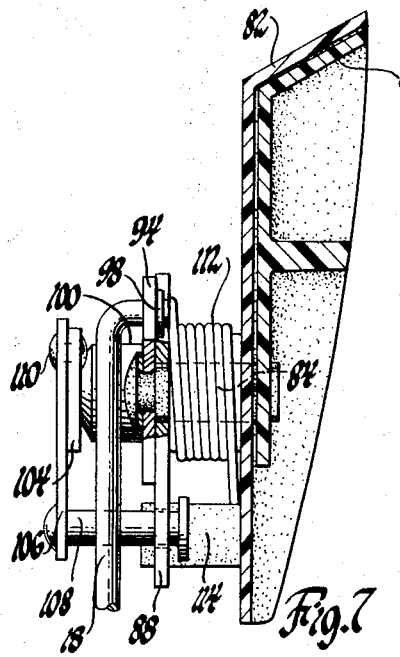
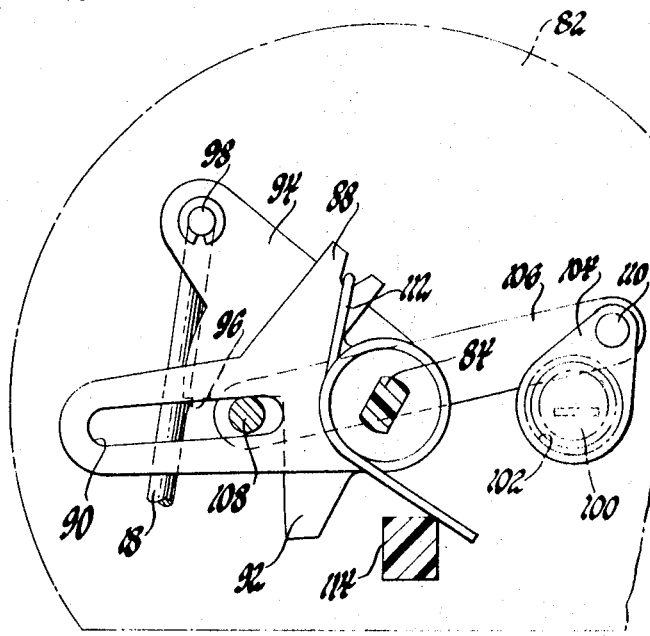

LATCH OPERATING ARRANGEMENT

This invention relates generally to an automobile-type door structure and in particular to operating arrangements for a latch mechanism carried by the door structure.

In modern automobile door structures, common latch mechanism operating arrangements employ a pushbutton to actuate the latch mechanism to release the door from latched or closed position. As a deterrent to forcible overpowering of the locking elements in the latch mechanism, virtually all pushbutton-type operating arrangements include lock means which when actuated by the proper key functionally remove the pushbutton from the operating arrangement so that it may be freely depressed without altering the locked condition of the latch mechanism. In the prior art, such operating arrangements have required expensive and complicated linkage systems both inside the latch mechanism and leading thereto from the control handle, which linkage systems are costly to manufacture and to install and adjust. In the latch mechanism operating arrangement according to this invention the pushbutton and the expensive and complicated linkage system is replaced by a self-contained handle unit including a handle member and a simplified lever arrangement for permitting selective freewheeling movement of the control handle. The handle unit is preassembled remotely from the door member and is operatively connected to the latch mechanism by a single link when installed on the door member.

The primary feature, then, of this invention is that it provides an improved latch mechanism operating arrangement. Another feature of this invention is that it provides an improved latch mechanism operating arrangement wherein a self-contained handle unit is mounted on a vehicle door member and connected to the door member latch mechanism by a single link and which handle unit includes all elements necessary to permit selective freewheeling movement of a handle portion of a handle unit. Yet another feature of this invention resides in the provision in the operating arrangement of a handle unit including an operating lever operatively connected to the door latch mechanism and rotatably mounted on an escutcheon, a handle rotatably mounted on the escutcheon on a common axis with the operating lever and rotatable or freewheelable relative thereto, and lock means on the escutcheon selectively operable to couple the operating lever and handle together for rotation as a unit. Yet another feature of this invention is that it provides a handle unit including the handle and a crank arm rotatable as a unit with the handle which crank arm carries a portion of a coupling link shiftable by a lock cylinder arrangement on the escutcheon into and out of a coupling position wherein the operating lever is movable by a portion of the intermittent link upon movement of the handle and crank arm. Still another feature of this invention is that it provides a handle unit wherein the handle means and operating lever are adaptable to rotate about an axis extending longitudinally of or an axis extending transversely of the escutcheon. These and other features of this invention will be readily apparent from the following specification and from the drawings wherein:

FIG. 4 is an elevational view of a modified embodiment of the handle unit portion of the latch mechanism operating arrangement according to this invention;

FIG. 5 is an enlarged elevational view of a portion of a modified handle unit portion and showing the operating lever, the handle and crank arm and the lock means in freewheelable relationship;

FIG. 6 is similar to FIG. 5 and showing the operating lever, the handle and crank arm and the lock means in coupled relationship; and FIG. 7 is an enlarged sectional view taken generally along the plane indicated by lines 7-7 in FIG. 4.

Automobile-type vehicles, typically include a body member defining at least one door opening and a door member conventionally vertically hinged on the body member for swinging movement relative to the door opening between an opened position wherein access may be had to the interior of the body member through the door opening and a closed position wherein the door member closes the door opening. The door member typically includes a latch mechanism for maintaining the door member in closed position and latch operating linkage or the like for selectively operating the latch mechanism from several locations on the door member on the inside and outside thereof to release the latter from the closed position.

Figure 1:
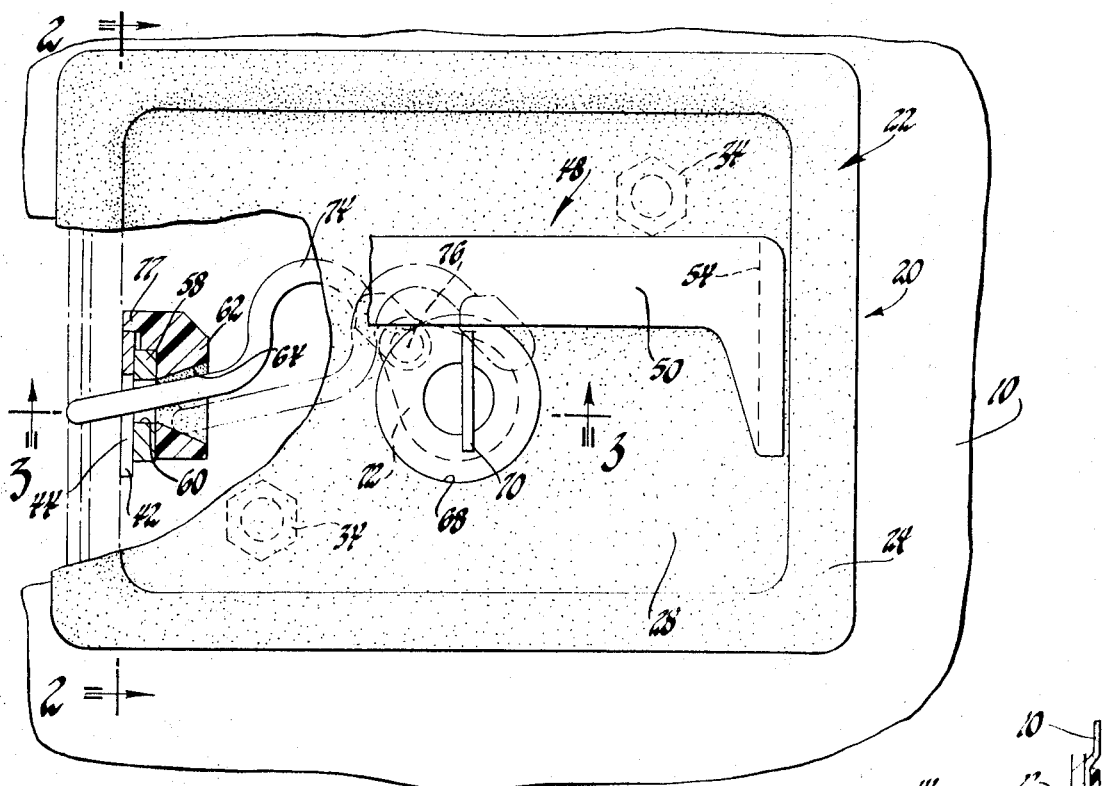
FIG. 1 is a partially broken away elevational view of the handle unit portion of a latch mechanism operating arrangement according to this invention.
Figure 2:
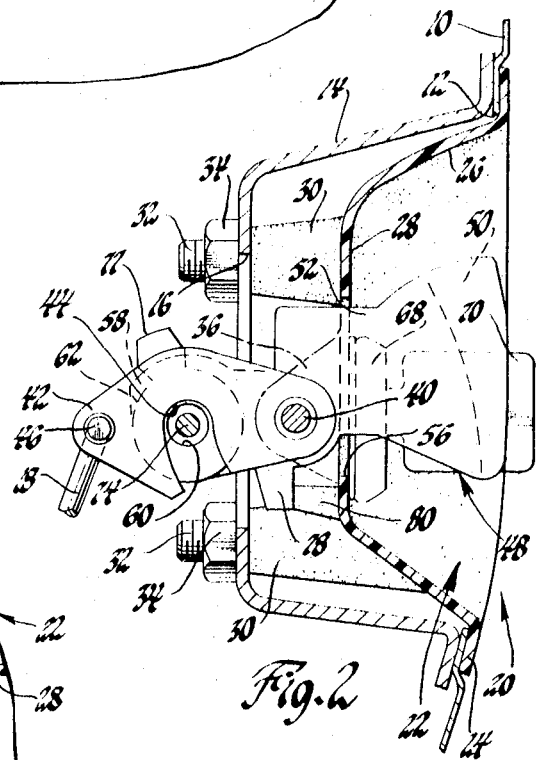
FIG. 2 is a sectional view taken generally along the plane indicated by lines 2-2 in FIG. 1.

Referring now to FIGS. 1 and 2 of the drawings, such a door member further typically includes an outer panel 10 having a handle opening 12 therein at any convenient height on the door member. A dished mounting bracket 14 having a clearance opening 16 through the innermost surface thereof is fixedly secured, as by welding, to the inside of the outer panel behind handle opening 12. The latch operating linkage operable by the present invention includes a shiftable draft link 18 operatively connected at one end thereof, not shown, to the door latch mechanism and at the other end to a latch operating arrangement generally designated 20, which draft link is operable through the latch operating arrangement of the present invention, as described hereinafter, from exteriorly of the body member to operate the door latch mechanism.

Figure 3:
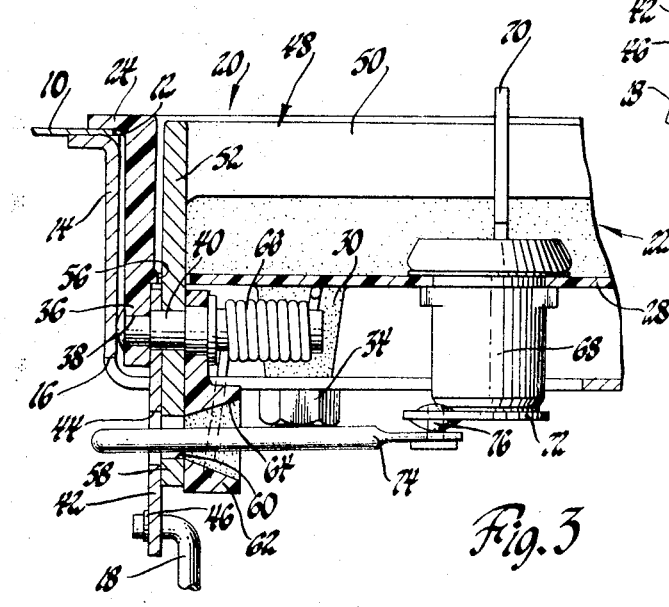
FIG. 3 is a sectional view taken generally along the plane indicated by lines 3-3 in FIG. 1.

Referring more particularly now to FIGS. 1, 2 and 3, the latch operating arrangement 20 includes an escutcheon 22 fabricated as by die casting from a material such as plastic or metal into a generally rectangular cup shape having a lip portion 24 extending around the margin thereof, the four sides integral with the lip 24 merging with a recessed base 28 integral with the sides. The base 28 has a pair of mounting projections 30 integral therewith which projections have studs 32 projecting therefrom. Each stud 32 protrudes through an aperture, not shown, in the innermost surface of the mounting bracket 14 and is engaged by a nut 34 to thereby mount the escutcheon 22 within the mounting bracket with the lip portion 24 thereof in generally flush relationship to the exterior surface of outer panel 10.

The escutcheon 22 further includes a pair of integral pivot supports extending rearwardly of base 32 and having pin apertures therein aligned on a generally longitudinal axis of the escutcheon, only support 36 with aperture 38 therein being shown. Shaft means in the form of a pair of pivot pins pressed into the apertures in the pivot supports of the escutcheon extend along the longitudinal axis of the latter, only pivot pin 40 pressed into aperture 38 being shown. An operating lever 42 having an arcuate slot 44 therein is rotatably mounted on pin 40 and has an end of shiftable draft link 18 pivotally connected thereto at 46. Clockwise rotary movement of the operating lever 42 from the position shown in FIG. 2 shifts the draft link 18 upward and thereby operates the door latch mechanism to release the door member from the closed position thereof.

Means are provided for selective actuation of the operating lever from exteriorly of the door member and include a handle 48 having a gripping bar 50 with sides 52 and 54 integral therewith. A pair of generally vertical slots are provided in base 28 of the escutcheon, as exemplified by slot 56 seen best in FIGS. 2 and 3, and each side of the handle member projects through a respective one thereof and is journaled on a respective one of the pivot pins for rotation of the handle generally within the escutcheon and about the longitudinal axis thereof between a retracted position, FIG. 2, and an extended position, not shown, rotated clockwise from the retracted position. A crank arm 58 in the form of an integral extension of side 52 of the handle member is rotatable as a unit with the handle about the pivot axis thereof and has a generally circular guide aperture 60 therein, which aperture, in the retracted position of the handle member, registers generally with the closed end portion of arcuate slot 44.

A guide member 62 having a conical aperture 64 therein is rotatably journaled on the pin 40 and is suitably fixedly secured to crank arm 58. A coil torsion spring 66 mounted on pin 40 and restrained at opposite ends on the escutcheon and the guide member 62 urges the guide member in a counterclockwise direction as viewed in FIG. 2 to thereby resiliently urge the handle member to its retracted position.

Lock means are provided for selectively coupling together the operating lever and handle and include a lock cylinder housing 68 which projects through an aperture in the base 28 of the escutcheon and which is fixedly secured thereto by conventional means. A lock cylinder assembly, not shown, is rotatably mounted in the housing 68 for movement between locked and unlocked positions by a key 70. A crank 72 is fixedly secured to the lock cylinder assembly and is rotatable as a unit therewith and has one end of a coupling link 74 secured thereto at 76 for limited universal movement. As shown in broken lines in FIG. 1, in the locked position of the lock cylinder assembly the free end of coupling link 74 rests within conical aperture 64 of the guide member 62 remote from the operating lever 42. With the coupling link thus withdrawn, the handle member 48, crank arm 58 and the guide member 62 are rotatable or freewheelable relative to the operating lever 42 with the coupling link pivoting about universal connection 76. Counterclockwise rotation of the lock cylinder assembly and crank 72 from the locked to the unlocked position, shown in broken and solid lines respectively in FIG. 1, bodily shifts coupling link 74 leftward urging the free end thereof out of conical aperture 64 into aperture 60 to be guided thereby into coupling position in arcuate slot 44 of the operating lever 42. With the coupling link thus in coupling position, rotary movement of the handle 48 from the retracted to the extended position causes crank arm 58 to carry the free end of the coupling link upward as a unit therewith which free end, in turn, engages the closed end of arcuate slot 44 to initiate clockwise rotation of the operating lever 42, FIG. 2, to shift the draft link 18 upward and operate the door latch mechanism to release the door member. Upon release of the handle, torsion spring 66 acting on guide member 62 rotates the latter counterclockwise and, through a leg 77 of the guide member, returns the operating lever 42 counterclockwise until a stop 78 integral with side 52 of the handle member contacts an abutment 80 integral with the escutcheon.

Thus, in operation, with the door member latched in closed position and the lock cylinder assembly in locked position, the handle and crank arm are freewheelable relative to the operating lever so that the door latch mechanism can not be operated from exteriorly of the body member. To open the door, the key 70 is inserted into the lock cylinder assembly and the latter is then rotated to unlocked position thus coupling together the operating lever and handle through the coupling link as described hereinbefore. To relock the door in latched condition, the lock cylinder assembly is merely returned to the locked position to withdraw the coupling link from the arcuate slot in the operating lever.

With reference now to FIGS. 4, 5, 6 and 7 in description of a modified embodiment of the present invention, the door outer panel 10 has a generally circular escutcheon 82 mounted thereon by conventional means, not shown, and in generally flush relationship thereto. Shaft means in the form of a pivot pin 84 rotatably journaled in the escutcheon 82 defines an axis extending generally transversely of the escutcheon and the door member. A handle 86 and crank arm in the form of a lever 88 are fixedly secured at opposite ends of the pin 84 for rotation as a unit about the escutcheon axis between a retracted position and an extended position rotated clockwise therefrom as shown in solid and broken lines respectively in FIG. 4. The lever 88 includes an elongated guide slot or aperture 90 and a stop 92. An operating lever 94 is rotatably mounted on pin 84 for movement relative to the handle and crank arm and has a bearing edge 96 thereon. The draft link 18, operatively connected to the door latch mechanism, is pivotally connected to the operating lever 94 at 98 so that clockwise movement of the latter, FIGS. 4, 5 and 6, shifts the draft link 18 upwardly to operate the door latch mechanism and release the door member from the closed position thereof.

Lock means are provided for selectively coupling together the operating lever and the handle and include a lock cylinder housing 100 protruding through an aperture in and secured by conventional means to the escutcheon in alignment with an aperture 102 in the handle 86 in the retracted position of the latter. A lock cylinder assembly having a crank 104 fixedly secured thereto is rotatably mounted within the housing 100 and is rotatable by a key, not shown, between a locked position and an unlocked position, shown respectively in FIGS. 5 and 6. A coupling link 106 with a projection 108 fixedly secured thereto has one end thereof pivotally connected to crank 104 at 110. As best seen in FIGS. 5, 6 and 7, the projection 108 protrudes through and is slidably received in elongated aperture 90 in the crank arm. Rotation of the lock cylinder assembly and crank 104 from the locked to the unlocked position bodily shifts the coupling link and slides the projection 108 generally from one end of the elongated aperture 90 to the other. A coil torsion spring 112, restrained at one end by both the operating lever 94 and lever 88 and at the other by the escutcheon, urges the handle and operating lever counterclockwise to the retracted position of the handle wherein stop 92 contacts an abutment 114 integral with the escutcheon 82.

Thus, in operation, with the lock cylinder assembly in the locked position thereof, FIG. 5, the projection 108 assumes a position generally at the outermost end of the elongated aperture 90 and remote from the operating lever 94. With the projection thus in a remote position relative to the operating lever, rotation of the handle from the retracted to the extended position thereof causes the lever 88 to lift the projection 108 upwardly, FIG. 5, along the side of and without contacting the operating lever 94. The handle is thus allowed to freewheel between retracted and extended positions without affecting the condition of the latch mechanism. Rotation of the lock cylinder assembly to the unlocked position thereof, FIG. 6, shifts coupling link 106 rightwardly and slides the projection 108 generally to the innermost end of the elongated aperture 90 and into underlying relationship relative to the bearing edge 96 of the operating lever 94. So positioned, rotation of the handle from the retracted to the extended position of the handle member causes lever 88 to lift the projection 108 upwardly and the projection, in turn, contacts bearing edge 96 and rotates the operating lever clockwise, shifting draft link 18 upwardly to operate the door latch mechanism and release the door member from the closed position thereof. Upon release of the handle, spring 112 rotates the handle and operating lever counterclockwise until stop 92 contacts abutment 114 whereupon the handle again assumes its retracted position ready for another operational cycle.

I claim:

1. In a vehicle including a body member and a door member mounted thereon for swinging movement between open and closed positions relative to a door opening in said body member, said door member having a selectively operable latch mechanism thereon for releasably maintaining said door member in said closed position thereof, the combination comprising an escutcheon, means mounting said escutcheon on said door member, an operating lever, means mounting said operating lever on said escutcheon for rotary movement about an axis of the latter, means operatively connecting said latch mechanism to said operating lever so that rotary movement of the latter operates the former to release said door member from said closed position, a handle, means mounting said handle on said escutcheon for rotation relative thereto and to said operating lever about said axis thereof between retracted and extended positions, a lock cylinder housing fixedly secured to said escutcheon remote from said handle, a lock cylinder assembly adapted for selective rotation in said lock cylinder housing between a locked and an unlocked position, a coupling link mounted on said escutcheon for bodily shiftable movement between coupling and uncoupling positions, means pivotally connecting one end of said coupling link to said lock cylinder assembly, rotation of said lock cylinder assembly from said locked to said unlocked position being operable to bodily shift said coupling link from said uncoupling to said coupling position, and means on said coupling link, said operating lever and said handle engageable in the coupling position of said coupling link and upon movement of said handle from said retracted to said extended position thereof to transfer such movement into rotary movement of said operating lever to operate said latch mechanism.

2. In a vehicle including a body member and a door member mounted thereon for swinging movement between open and closed positions relative to a door opening in said body member, said door member having a selectively operable latch mechanism thereon for releasably maintaining said door member in said closed position thereof, the combination comprising an escutcheon, means mounting said escutcheon on said door member, shaft means on said escutcheon defining an axis on the latter, an operating lever mounted on said shaft means for rotation relative thereto about said axis, means operatively connecting said latch mechanism to said operating lever so that rotary movement of the latter operates the former to release said door member from said closed position, a handle mounted on said shaft means for rotation about said axis relative to said operating lever and to said escutcheon between retracted and extended positions, a lock cylinder housing fixedly secured to said escutcheon remote from said handle, a lock cylinder assembly adapted for selective rotation in said lock cylinder housing between a locked and an unlocked position, a coupling link mounted on said escutcheon for bodily shiftable movement between coupling and uncoupling positions, means pivotally connecting one end of said coupling link to said lock cylinder assembly, rotation of said lock cylinder assembly from said locked to said unlocked position being operable to bodily shift said coupling link from said uncoupling to said coupling position, a crank arm having an aperture therein, and means mounting said crank arm on said shaft means for rotation about said axis as a unit with said handle, said coupling link being received at all times within said aperture of said crank arm to rotate as a unit therewith, said coupling link including means thereon engageable in said coupling position thereof with said operating lever to transfer rotation of said crank arm into rotation of said operating lever to operate said latch mechanism.

3. In a vehicle including a body member having a door opening and a door member swingably mounted on said body member for movement between open and closed positions relative to said door opening, said door member having a selectively operable latch mechanism thereon for releasably maintaining said door member in said closed position, the combination comprising an escutcheon, means mounting said escutcheon on said door member in generally flush relationship to a surface of the latter, shaft means on said escutcheon defining an axis extending generally transversely thereof, an operating lever mounted on said shaft means for rotation relative to said escutcheon about said transverse axis, means operatively connecting said operating lever to said latch mechanism so that rotation of the former operates the latter to release said door member from said closed position thereof, a handle mounted on said shaft means for rotation about said transverse axis relative to said operating lever and to said escutcheon between retracted and extended positions, a lock cylinder housing fixedly secured to said escutcheon remote from said handle, a lock cylinder assembly adapted for rotation in said lock cylinder housing between locked and unlocked positions, a coupling link having a projection thereon, means pivotally connecting one end of said coupling link to said lock cylinder assembly so that rotation of the latter from locked to unlocked position bodily shifts said coupling link from an uncoupling to a coupling position, and a crank arm mounted on said shaft means for rotation about said transverse axis as a unit with said handle, said crank arm having an elongated aperture therein, said elongated aperture slidably receiving said projection on said coupling link so that said crank arm is operable upon rotation of said handle from said retracted to said extended position to rotate said coupling link and upon shiftable movement of said coupling link to said coupling position to guide said projection from a position remote from said operating lever to a position wherein such rotation of said coupling link initiates contact between said operating lever and said projection so that the latter rotates the former to release said door member from said closed position thereof.

4. In a vehicle including a body member having a door opening and a door member swingably mounted on said body member for movement between open and closed positions relative to said door opening, said door member having a selectively operable latch mechanism thereon for releasably maintaining said door member in said closed position, the combination comprising an escutcheon, means mounting said escutcheon on said door member in generally flush relationship to a surface of the latter, shaft means on said escutcheon defining an axis extending generally longitudinally thereof, an operating lever mounted on said shaft means for rotation relative to said escutcheon about said longitudinal axis, said operating lever including a slot having one closed end, means operatively connecting said operating lever to said latch mechanism so that rotation of the former operates the latter to release said door member from said closed position thereof, a handle mounted on said shaft means for rotation about said longitudinal axis relative to said operating lever and to said escutcheon between retracted and extended positions, said handle including an integral crank arm having an aperture therein, a lock cylinder housing fixedly secured to said escutcheon remote from said handle, a lock cylinder assembly adapted for rotation in said lock cylinder assembly between locked and unlocked positions, a coupling link, means pivotally connecting one end of said coupling link to said lock cylinder assembly so that rotation of the latter from said locked to said unlocked position bodily shifts said coupling link from an uncoupling to a coupling position wherein a portion of said coupling link lies within said operating lever slot, said crank arm aperture receiving a portion of said coupling link in said coupling position of the latter so that said crank arm is operable upon rotation of said handle from said retracted to said extended position to rotate said coupling link, said coupling link being operable upon such rotation and in said coupling position thereof to engage said closed end of said operating lever slot and rotate said operating lever to release said door member from said closed position thereof.